May 13, 1958 J. SAMARITANO 2,834,211
LIQUID FUEL GAUGE FOR AIRCRAFT
Filed March 25, 1952
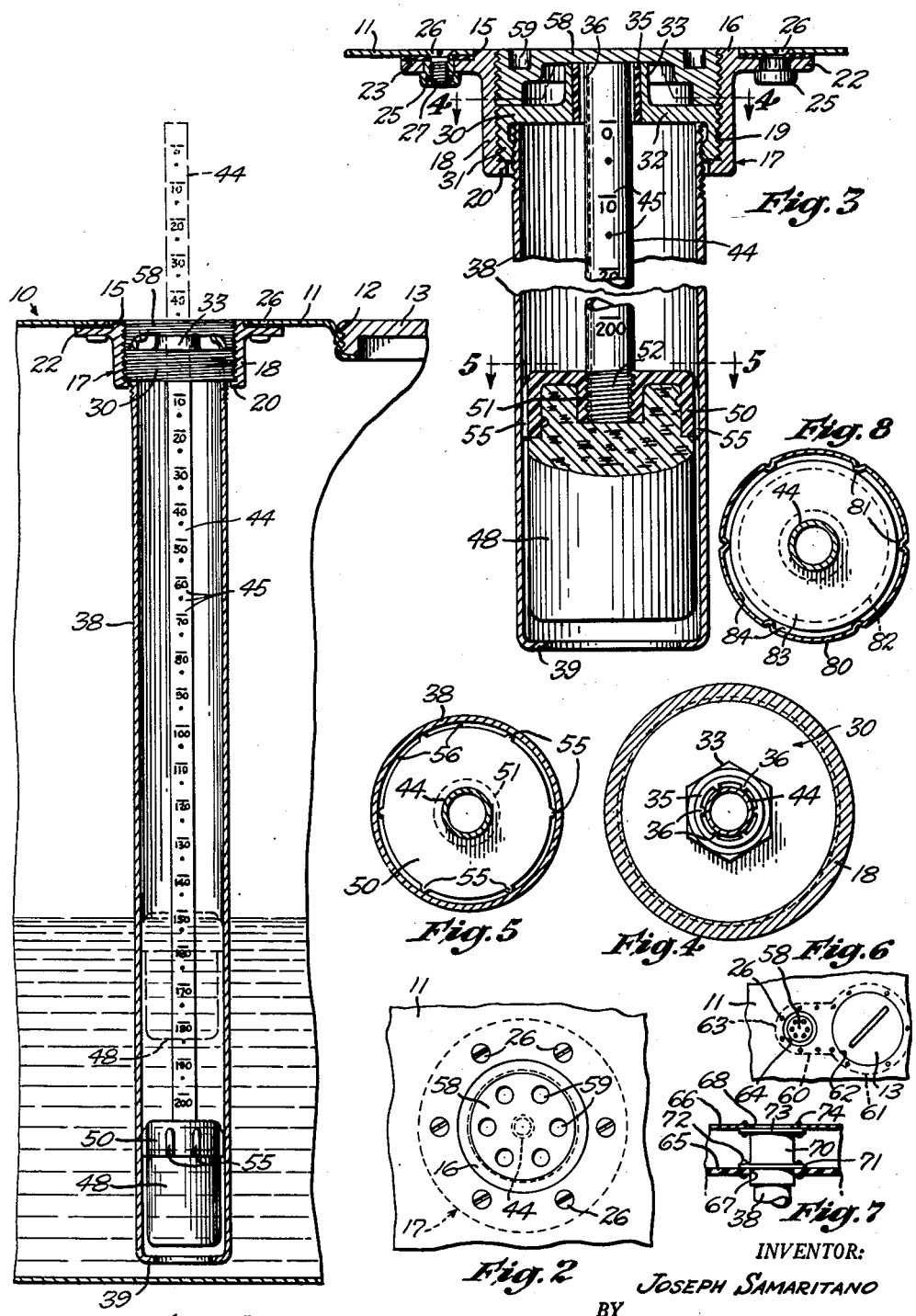
INVENTOR:
JOSEPH SAMARITANO
BY
AGENT

United States Patent Office 2,834,211
Patented May 13, 1958

2,834,211

LIQUID FUEL GAUGE FOR AIRCRAFT

Joseph Samaritano, Hawthorne, Calif.

Application March 25, 1952, Serial No. 278,421

10 Claims. (Cl. 73—422)

This invention relates generally to liquid fuel gauges and more particularly to a float-actuated gauge for indicating the liquid content of a receptacle. Specifically the invention is concerned with a float-operated device for indicating the volume of liquid within a tank, for example, the amount of liquid fuel present in a fuel tank of an aircraft.

It is customary when servicing an airplane for flight to check the quantity of liquid fuel present in its tank or tanks. According to the present method used, the serviceman or mechanic first removes the filler cap at the upper surface of the wing and then lowers a graduated "dip stick" into the tank after which the stick or gauge is removed and examined to ascertain the height on the stick to which the liquid level in the tank has risen. Such measurement is usually made before the refueling operation is started to determine the amount of fuel used during the previous flight and to determine the additional amount of fuel required to fill the tank. The filler hose nozzle is then inserted in the filler opening and the fuel is pumped into the tank to either fill the same or increase its content to any predetermined level, the gallonage then being checked by re-inserting the dip stick into the tank and observing the height of the fuel on the stick.

This method of determining the quantity of liquid fuel in an aircraft tank thus involves the use of a measuring stick which must be carried on the person or on the refueling truck and which is apt to be misplaced. Moreover, such a stick may become soiled with grease, dust or other foreign matter so that when it is inserted into the tank such foreign matter may be absorbed by the fuel to impair its quality and its free flow to the power plants of the aircraft.

According to the accepted standard of procedure for refueling aircraft tanks, lowering of the dip-stick completely to the bottom of the tank is discouraged for the reason that such contact of the stick with the tank might result in cracking or otherwise damaging the corrosion-inhibiting coating material which lines the tank. Thus, extreme caution must be exercised by the workman and this further adds to the inconvenience and time involved in carrying out the refueling of the tank. In addition, due to the highly volatile nature of the fuel, the liquid evaporates very quickly from the measuring stick so that the point of the stick to which the fuel has extended is frequently undeterminable and several attempts to obtain the reading may be necessary. Conversely, it has been found that when the dip-stick remains in the fuel tank for only a few seconds, the liquid fuel tends to creep upwardly along the stick so that it indicates on the stick a liquid volume which is in excess of that actually existing in the tank.

Another disadvantage of the dip-stick system of gauging the fuel in the tanks of aircraft is that the workman must assume a position upon or adjacent the wing when filling the tank so that it is impossible for him to observe the flow gauge usually provided on the refueling tank truck for measuring the quantity of liquid fuel delivered. Is is apparent, therefore, that unless two workmen are employed, one to watch the truck gauge and the other to operate the delivery nozzle, the single workman on the tank must periodically stop the filling operation and gauge the content of the tank being filled by means of the conventional dip-stick and this procedure obviously results in a considerable loss of time. It frequently occurs that when the weight of the aircraft is checked, just prior to take-off, it is found to be excessive or to be over-balanced so that some of the liquid fuel in certain of the tanks must be removed. The use of a dip-stick gauge for checking such removal of fuel is at best a trial-and-error procedure which consumes much valuable time. At best then, such a conventional method of gauging the quantity of fuel in an aircraft tank not only entails a laborious and time-consuming operation but frequently involves inaccurate readings which may result in underfilling or overfilling of the fuel tank.

Various types of liquid level gauges have been proposed in the past, such devices being mounted on and extending into the tanks, and operative to give either a continuous indication of the quantity of liquid or to gauge the liquid only when required. Such liquid level gauges have included a float-actuated stick or graduated rod telescopically arranged within a guide tube with its upper end adapted to project above the tank to indicate the amount of liquid within the tank. In many such gauge devices, the gauge rod is normally retained within the tank by reason of a filler cap which overlies the upper end of the rod and which, when removed, allows the float to rise so as to project the rod above the tank.

While such gauge devices may be used with some degree of success in connection with tanks containing various liquids in industrial plants and in some vehicles, they are wholly unsuitable for use in gauging the fuel in the tanks of aircraft. For example, in all such gauges for indicating the liquid level in a tank, the mounting means for the vertically slidable gauge rod projects upwardly above the top of the tank and such a condition obviously cannot be tolerated in aircraft where the top wall of the tank is constituted by the upper surface or "skin" of the aircraft wing, since such projection would create drag tending to impair the aerodynamic characteristics of the wing. Moreover, the mounting means of such prior gauging devices are made either as an integral portion of the fuel tank and thus involve special fabrication, or they are made as separate, large and heavy holders which must be applied to the tank during the manufacture of the latter. In any event, such mounting means are not adapted for installation after the tank has been installed in an aircraft.

Another disadvantage of such prior liquid gauges is that their floats have a close fit in the guide tube so that a frictional binding action takes place which interferes with the free sliding movement of the float and its gauge rod. To alleviate this condition, considerable clearance has been provided between the float and the guide tube but this allows sidewise movement of the float, due to movement of the liquid within the tank, so that the float rod may eventually become bent. As will be apparent, metal-to-metal rubbing contact of the float rod in its bearing provides a possible source of static electricity and this has no doubt been a reason for failure of aircraft producers and airline operators to adopt such previously proposed fuel gauges. The majority of such previous fuel gauges employ a float-guiding tube which has openings in its sides through which the liquid may flow and this has been found to be detrimental for the reason that during the filling of the tank the liquid is subjected to considerable turbulence which has the effect to cause undue vertical reciprocation or fluctuation of the float and its gauge rod, thus making it difficult to obtain an accurate reading of the gauge.

A further deficiency of prior liquid level gauges resides in the fact that the float is calculated to have a buoyancy which will cause it to project above the liquid level to a considerable distance. Consequently, when the float reaches its uppermost position where it engages the upper closure element of the float tube, it erroneously indicates a full tank, whereas considerable space may still remain in the upper portion of the tank for receiving additional liquid.

It is an aim of my invention to obviate the difficulties and inefficiencies discusssed above by providing a fuel gauge designed especially for use in indicating the amount of liquid fuel in the supply tank of an aircraft, said gauge being highly efficient and accurate in designating automatically the fuel level and eliminating the need for a separate measuring stick for the purpose.

Another object of the invention is to provide a fuel gauge for aircraft which normally is entirely enclosed within the tank so as to avoid impairment of the smooth contour of the outer surface or "skin" of the aircraft wing in which the tank is located. In accordance with the invention, this object is attained by providing a float guide tube having an upper threaded head screwed into an annular flange-like member secured to the under side of a wall forming the top of the tank and the upper surface of the wing. The head has a central bore in which is slidable a rod or tube carrying at its lower end a float, the float and its rod thus being telescopically mounted for vertical movement in the head and guide tube. The float tube or rod has longitudinally spaced graduations representing gallons of fuel, in multiples of, for example, five or ten, gallons, depending upon the capacity of the tank and the accuracy required. By this gauge construction, the float actuated gauge tube is projected above the top surface of the wing to indicate to the servicing attendant during the entire refueling operation the exact amount of fuel in the tank. The gauge tube is, however, normally confined within the tank by means of a cap screwed downwardly into the flange member and engaging the upper end of the gauge tube to maintain the latter depressed within the tank. Said cap, when screwed into place, forms a continuation of the upper skin of the aircraft wing so that the aerodynamic characteristics of the wing are not impaired.

Another object of my invention is to provide a fuel gauge for aircraft which is made extremely light in weight so as not to materially alter the over-all weight of the airplane which might diminish the pay-load thereof, the main elements of the gauge being constructed from aluminum alloy stock and the float being of extremely lightweight material, such as cork. By this construction, each complete gauge unit has the low weight of approximately twelve ounces.

Another important object of my invention is to provide a fuel gauge, of the character referred to in which the mounting flange may be secured in place on the aircraft wing during fabrication of the latter or conveniently applied to the tanks of existing aircraft, and in which case the entire gauge unit may be readily applied to and removed from the tank by simply screwing the threaded head of the guide tube into and from said mounting flange. Thus, by this construction, the gauge may be easily and quickly removed for periodic inspection as required.

A further object is to provide a gauge of the type specified in which the float has projections on its periphery providing spaces between the float and the guide tube through which the liquid fuel can pass, the head of the guide tube also having similar projections between the head and the float rod. In accordance with the present concept, these guide projections are made from dielectric material so as to insulate the float rod from the tank and wing and thus preclude the flow of static electricity which might otherwise be generated within the tank due to frictional engagement of the rod in its bearing.

Another object is to provide a liquid fuel gauge in which the float-guiding tube is devoid of openings in its sides but has an opening in its lower end through which the liquid fuel can enter the tube. By this provision, the float is not influenced by the turbulent action of the liquid during the refueling operation and thus remains stable without bobbing during its gradual upward movement as the tank is filled. A related object is to provide a float tube, the lower end of which has an inwardly bent flange serving as a stop to limit downward movement of the float and to thus avoid the possibility of the float striking the bottom of the tank.

A further object is to provide a gauge of the class referred to in which the float tube has an externally threaded head at its upper end to adapt the entire gauge to be screwed into and removed from the mounting flange member, the lower end of said head also being internally threaded to receive the upper screw-threaded end of the guide tube. By this construction, the guide tube and its enclosed float may be initially adjusted vertically so as to accurately dispose the float adjacent the bottom of the tank.

A still further object of the invention is to provide a device, of the class referred to, which is extremely simple in construction, durable in use, efficient in performing its intended function and one which lends itself to mass production so as to minimize the cost of manufacture.

Further objects will appear from the following description, and from the drawing, which is intended for the purpose of illustration only, and in which:

Fig. 1 is a part-sectional side elevational view of my improved liquid fuel gauge, showing it applied to use in connection with the fuel tank of an aircraft;

Fig. 2 is a plan view of the gauge;

Fig. 3 is an enlarged vertical sectional view through the gauge;

Fig 4 is a cross-sectional view, taken on line 4—4 of Fig. 3;

Fig. 5 is a cross-sectional view, taken on line 5—5 of Fig. 3;

Fig. 6 is a small scale, fragmentary plan view of a fuel tank, showing an alternative form of mounting means in which a filler spout is incorporated;

Fig. 7 is a small scale, fragmentary sectional view of a separate, resilient, fuel tank employed in some aircraft, showing a further modified means for mounting my fuel gauge on such a tank; and Fig. 8 is a cross-sectional view, similar to Fig. 5, illustrating an alternative form of float and guide tube.

Referring to the drawing in detail, my improved liquid fuel gauge is designed specifically for use in connection with the fuel tank 10 of an aircraft, the reference numeral 11 designating the top wall of the tank and, incidentally, the top surface or "skin" of the aircraft wing. The top wall 11 of the tank 10 is provided with the usual filler opening 12 which normally is closed by the removable filler cap 13. In the embodiment of the invention illustrated in Figs. 1 through 5, the tank wall 11 is provided with a circular opening 15 which receives the upper reduced end 16 of a mounting member 17.

The member 17 has an axial sleeve portion 18 which has a screw-threaded bore 19. At its lower end, the mounting member 17 has an inwardly directed portion providing an annular rest or seat 20. Adjacent its upper end, the member 17 has a peripheral flange 22 which is adapted to be positioned against the under surface of the top wall 11, with a sealing ring 23 interposed therebetween if desired. The flange 22 has a series of circumferentially-spaced holes which register with similar holes in the wall 11. The mounting member is permanently secured in place against the wall 11 by means of screws, rivets or other fastening means, the present drawing illustrating the member as attached to said wall by means of nuts 25 and screws 26, the upper ends of the bolts being flush with the upper surface of the aircraft wing. The nuts are forced into the holes in the member 17 and have fiber locking rings 27 therein.

The mounting member 17 may be assembled in place on the aircraft wing during the fabrication of the latter so that the new airplane will be pre-fitted to receive the fuel gauge. However, my improved fuel gauge is so designed that it may be applied to use with existing aircraft, as an accessory thereto. To assemble the gauge on such existing aircraft, the wing surface 11 is cut with a suitable tool to provide the opening 15, after which the rivet or bolt holes may be located by the use of a template and drilled through the sheet metal. The mounting member 17, having the nuts 25 thereon, then is lowered through the filler opening 12 and moved laterally into axial alignment with the opening 15, the bolts 26 finally being inserted downwardly through the aligned bolt holes and screwed into the nuts 25 to secure the mounting member in place.

The fuel gauge also includes a cylindrical head 30 which is externally threaded to adapt it to be screwed downwardly into the mounting member until its lower end abuts the seat 20. The head 30 has a depending counterbored skirt portion 31 which is provided with internal screw threads of fine pitch. Above its transverse wall 32, the head 30 has an axial boss 33 which is preferably made hexagonal in outline to provide a nut-like portion adapted to be engaged and turned by a socket-wrench when inserting and removing the head from the mounting member 17. The head 30 has a relatively small axial bore, into which a sleeve 35 of dielectric material is pressed, the sleeve having internal fins or splines 36.

Screwed into the skirt portion 31 of the head 30 is the upper threaded end of a guide tube 38 having a relatively thin cylindrical wall. At its lower end, the wall of the tube 38 is pressed inwardly to provide an annular flange-like seat or stop 39. The guide tube 38 is of a length to adapt its lower end to be positioned adjacent but slightly above the fuel tank in which the gauge is installed. It is to be noted at this point that the guide tube is devoid of perforations or openings in its sides but that its lower end is left open. By this provision, liquid fuel in the tank may enter the guide tube only through its lower open end. By means of the inter-engaging fine screw threads of the head 30 and the upper end of the tube 38, the latter may be adjusted vertically so as to locate the lower end of the tube close to the bottom wall of the tank, as shown.

Arranged for sliding movement in the sleeve 35 of the head 30 and adapted to telescope within the guide tube 38 is a gauge rod or stick 44 which, as shown, is preferably made from tubing stock. The rod 44 is provided with graduations 45 representing liquid gallon measurements in increments of, for example, five gallons, each ten-gallon graduation being designated by the appropriate member. The graduations may also include the designations Empty, "¼," "½," "¾," and "Full," if desired. It is of course, within the concept of this invention to mark the gauge rod with any selected lines, dots, etc., representing desired units of liquid measurement. As will be noted by reference to Figs. 2 and 4, the splines 36 of the plastic sleeve 35 together provide a bearing through which the rod 44 may slide freely with a minimum of frictional resistance and without causing static electricity.

Carried at the lower end of the gauge rod 44 is a cylindrical float 48 adapted to slide vertically within the guide tube 38. While the float 48 may be constructed from various materials, I have found that it is highly efficient when made from cork laminations bonded together and coated by a gasoline impervious substance, such as shellac. Screwed onto the upper end of the float 48 is a plastic float cap 50 having a depending, central, internally threaded hub 51 inserted in a recess in the upper end of the float. The hub 51 is adapted to receive the lower threaded end 52 of the gauge rod 44 which is screwed thereinto.

Attention is directed to the fact that the float cap 50 is provided with circumferentially-spaced, longitudinally extending ribs or splines 55. These splines fit relatively closely against the interior of the guide tube 38, that is, with only a few thousandths of an inch clearance, to adapt the float 48 to slide freely within the tube 38 while minimizing sidewise movement thereof. Thus, the float 48 may be said to have only point-to-point contact with the guide tube 38. The peripheral areas of the float cap 50 between the splines define, with the interior surface of the tube 38, a plurality of arcuate spaces 56 through which the liquid fuel can flow into and from the guide tube. By this provision, sheer stress, which usually develops as a result of the force of the liquid fuel of somewhat viscous nature acting between a closely fitting float is avoided so that the float telescopes within the guide tube without frictional binding action. It is to be noted also that the float rod 44 slides freely within the plastic, splined sleeve 35 with point-to-point contact and that the non-metallic sleeve avoids static electricity which might occur as a result of friction as the float tube slides within the head and when these parts are constructed from metal.

A screw-threaded closure disc or cap 58 is adapted to be screwed into the upper or outer end of the mounting member 17 to seal the upper end of the gauge when the latter is not in use. The cap 58 may be provided with sockets 59 by which it can be screwed into and removed from the mounting member, by use of a spanner wrench. When the cap 58 is screwed down completely into the mounting member 17 it engages against the upper end of the head 30 of the guide tube 38 to limit such downward movement of the cap. At this time, the upper surface of the cap lies flush with the upper surface of the aircraft wing so that the smooth contour of the wing section is maintained. It is also to be observed that when the cap 58 is in place, it engages the upper end of the gauge tube or rod 44 to depress the latter so as to cause its float 48 to assume a position adjacent the lower end of the guide tube 38 as shown in Figs. 1 and 3.

Assuming that the airplane is to be refueled, the workman takes up a position adjacent the filler opening 12 and the gauge cap 58, after locating the refueling truck close to the wing and extending the fuel hose up onto the wing. The operator then removes the cap 58 to free the float rod 44 which then rises, due to the buoyancy of the float 48 as the latter comes to rest at the surface of the liquid fuel remaining in the tank 10. Thus, the upper end of the gauge rod 44 extends above the top 11 of the tank and wing, as indicated by the broken line in Fig. 1, and the operator determines the amount of fuel in the tank by observing the graduation which now registers with the top of the boss 33, and he may record this reading. The workman then removes the filler cap 13 and inserts the hose nozzle into the tank, after which the nozzle valve is opened to establish flow of the liquid fuel into the tank.

As the liquid fuel is introduced into the tank, the level of the liquid rises to cause the float 48 to rise within the guide tube 38, the liquid entering this tube only through its open lower end. Thus, as the liquid level rises, the float and its gauge rod or tube 44 rise gradually and freely to project the upper end of the rod progressively higher, and during this time the operator watches the graduations on the rod. Eventually, the gauge rod 44 reaches a height where it indicates that the predetermined quantity of liquid fuel has been placed in the tank or that the tank has reached a full condition, at which time the nozzle valve is closed to discontinue the flow and the filler cap 13 replaced.

It is to be particularly noted that through the use of my fuel gauge, which functions to indicate the rising fuel level during the entire refueling operation, the progress of the filling can be readily followed. As an important feature of my invention, the buoyancy of the float 48 is so calculated that nearly the entire length of the float is submerged within the liquid fuel. Thus, when the float rises to its full upper position where it engages the wall 32 of the head 30, to indicate a full tank, a substantially full condition actually exists. This is an improvement over prior fuel gauges in which the float has greater buoyancy and thus erroneously indicates a full tank condition when it rises to its uppermost position to strike a part of the mounting means. That is to say, unless the float is capable of rising to a point where its effective liquid level line is in proximity to the top of the tank, then the gauge rod will indicate a full condition, even though there remains a substantial space in the upper portion of the tank into which might be introduced many more gallons of the fuel. On the other hand, when the upward movement of my gauge float is arrested to indicate a full tank condition, there remains an unfilled chamber at the top of the tank which is approximately one-half inch in height, a space of such volume having been found to be sufficient to compensate for thermal expansion of the full supply of the liquid fuel within the tank.

The present fuel gauge not only makes for greater convenience in refueling an aircraft tank but provides for greater accuracy of filling, it having been found that this gauge device is far more reliable than the conventional dial gauge provided on the refueling trucks. Moreover, my fuel gauge results in a substantial saving of time and expense and this is attributed to the fact that a single workman, positioned at the tank, controls the entire operation so that the need for a second man stationed at the refueling truck is avoided.

After the refueling operation has been completed, the gauge cap 58 is screwed down into the mounting member to telescope the rod 44 into the guide tube 38 and to force the float 48 to the lower end of the tube. If the rod 44 is manually depressed, the float is prevented from striking the bottom of the tank by reason of the inturned stop flange 39. The vented filler cap 13 is finally reinserted to complete the refueling operation. If, at any time, it is desired to check the content of the fuel tank, as when liquid fuel is being withdrawn, it is only necessary to remove the gauge cap 58 to allow extension of the gauge rod 44 above the tank to give a quick, accurate, and continuous indication of the fuel level.

It will be apparent that the various parts of my gauge device may be made from various light weight materials. While plastic materials may be advantageously employed, I prefer to make the several components, with the exception of the float, from anodized aluminum alloy, such material having the advantage of being light in weight, strong and durable in use, and corrosion resistant. As is well known, the weight factor of all aircraft components is of vital importance to designers and to airline operators. It has been determined that the total weight of my entire fuel gauge, including the mounting member, averages approximately ten to twelve ounces so that its installation on the aircraft will not materially alter the weight thereof. Another advantage of my gauge construction resides in the fact that it includes a number of very simple parts which are readily assembled and disassembled so that in the event that replacement of any part becomes necessary, this can be done without replacing the entire gauge unit.

Referring now to Fig. 6, the invention also contemplates the use of combined filler spout and gauge mounting member 60. This member is in the form of a plate having a relatively large arcuate portion 61 provided with an opening 62 and a smaller arcuate extention 63 having an opening 64. The member 60 is secured in place against the bottom surface of the upper wall of the tank by means of the bolts 26 with its openings 62 and 64 registering with openings in the top wall of the tank. When the member is secured in place, its opening 62 is adapted to receive the filler cap 13 while the screw-threaded opening 64 receives the head 30 and the gauge cap 58 as in the embodiment of the invention illustrated in Figs. 1 to 5.

In some aircraft, particularly those used for military purposes, it is common practice to employ fuel tanks constructed from a resilient material which is self-sealing in the event of penetration thereof by bullets. The upper portion 65 of such a separate tank is shown in Fig. 7 as located within the aircraft wing 66. To apply my liquid fuel gauge to such a fuel tank, the latter is provided with an opening 67 in its top wall which registers with a similar opening 68 in the upper surface or skin of the aircraft wing. A special tubular mounting member 70 in the form of an adapter, has a lower flange 71 which is secured to the upper wall 65 of the fuel tank by bolts 72, rivets or other fastening means. An upper flange 73 of the member 70 is likewise connected to the upper surface of the wing 66 by fastening means 74, the member thus being connected between the wing and the tank in alignment with their openings 67 and 68. The mounting member 70 has a threaded bore into which the head 30 of the guide tube 38 and the cap 58 are screwed. Thus, the member 70 provides an extension of the fuel tank and a support for the various elements of the gauge mechanism previously described.

Referring now to Fig. 8, the invention further contemplates a modified form of float and guide tube. In this embodiment, the float guide tube 80 is formed with inwardly directed, longitudinally extending ribs or splines 81 providing circumferentially-spaced guides which co-operate in defining a bearing in which the float 82 and its cap 83 slide vertically within the tube. The float 82 and the cap 83 have smooth cylindrical surfaces so that the splines 81 provide, in effect, point-to-point bearings for the float to minimize friction between the float assembly and its guide tube. At the same time, arcuate spaces 84 are provided by which the liquid fuel surrounds the float. This spline arrangement is, therefore, the reverse of that previously described in connection with the embodiment illustrated in Figs. 1 to 5.

In accordance with the provisions of the patent statutes, I have described the principle of operation of my invention, together with the devices which I now consider to represent the best embodiments thereof, but I desire to have it understood that the devices shown are only illustrative and that the invention may be carried out by further modified means.

I claim as my invention:

1. A gauge for indicating the liquid content of an aircraft fuel tank, comprising: an annular mounting member securable against the under surface of the top wall of the tank in axial alignment with an opening in said wall and with its upper end flush with the top surface of said wall, said member having a threaded axial bore; a circular head screwed downwardly into said bore and having a bore at its upper end and a screw-threaded counterbore at its lower end; a guide tube having an upper threaded end adjustably screwed into said counterbore, said tube depending from said head; a graduated gauge tube telescopically mounted in said guide tube with its upper end slidable in said bore of said head; a float connected to the lower end of said gauge tube and slidable vertically in said guide tube, said float and gauge tube assembly being adapted to float on the liquid fuel in the tank and to rise within the guide tube to project its upper end above the tank in response to rise of the liquid level; and a cap screwed into the upper end of said mounting member with its upper surface adapted to align with the upper surface of the top wall of the tank.

2. A gauge for indicating the liquid content of an aircraft fuel tank, comprising: an annular mounting member securable against the under surface of the top wall of the tank and having an upper reduced portion fitting within an opening in said wall and with its upper end flush with the top surface of said wall, said member having a threaded axial bore; a circular head screwed downwardly into said bore and having a bore at its upper end and a screw-threaded counterbore at its lower end; a guide tube having an upper threaded end adjustably screwed into said counterbore, said tube depending from said head; a graduated gauge tube telescopically mounted in said guide tube with its upper end slidable in said bore of said head; a float connected to the lower end of said gauge tube and slidable vertically in said guide tube, said float and gauge tube assembly being adapted to float on the liquid fuel in the tank and to rise within the guide tube to project its upper end above the tank in response to rise of the liquid level; and a cap screwed into the upper end of said mounting member with its upper surface adapted to align with the upper surface of the top wall of the tank.

3. A gauge for indicating the liquid content of an aircraft fuel tank, comprising: an annular mounting member securable against the under surface of the top wall of a tank having an opening in said wall, said member having an upper reduced portion fitting within said opening in said wall and with said upper reduced portion flush with the top surface of said wall, said member having a threaded axial bore and having an annular shoulder at its lower end; a circular head screwed downwardly into said bore and having a bore at its upper end and a screw-threaded counterbore at its lower end, said head engaging said shoulder; a guide tube having an upper threaded end adjustably screwed into said counterbore, said tube depending from said head; a graduated gauge tube telescopically mounted in said guide tube with its upper end slidable in said bore of said head; a float connected to the lower end of said gauge tube and slidable vertically in said guide tube, said float and gauge tube assembly being adapted to float on the liquid fuel in the tank and to rise within the guide tube to project its upper end above the tank in response to rise of the liquid level; and a cap screwed into the upper end of said mounting member with its upper surface adapted to align with the upper surface of the top wall of the tank.

4. A gauge for indicating the liquid content of an aircraft fuel tank, comprising: an annular mounting member securable against the under surface of the top wall of the tank and having an upper reduced portion fitting within with an opening in said wall and its upper end flush with the top surface of said wall, said member having a threaded axial bore and having an annular shoulder at its lower end; a circular head screwed downwardly into said bore and having a bore at its upper end and a screw-threaded counterbore at its lower end, said head engaging said shoulder; a bearing sleeve of dielectric material disposed in said bore of said head and having integral, internal splines therein; a guide tube having an upper threaded end adjustably screwed into said counterbore, said tube depending from said head; a graduated gauge tube telescopically mounted in said guide tube with its upper end slidable in said internally splined bearing sleeve, said bearing sleeve serving to guide the gauge tube and to vent the guide tube; a float connected to the lower end of said gauge tube and slidable vertically in said guide tube, said float and gauge tube assembly being adapted to float on the liquid fuel in the tank and to rise within the guide tube to project its upper end above the tank in response to rise of the liquid level; and a cap screwed into the upper end of said mounting member and engageable with said circular head so as to cause its upper surface to align with the upper surface of the top wall of the tank.

5. A gauge for indicating the liquid content of an aircraft fuel tank, comprising: an annular mounting member securable against the under surface of the top wall of the tank and having an upper reduced portion fitting within an opening in said wall and with its upper end flush with the top surface of said wall, said member having a threaded axial bore and having an annular shoulder at its lower end; a circular head screwed downwardly into said bore and having a bore at its upper end and a screw-threaded counterbore at its lower end, said head engaging said shoulder; a bearing sleeve of dielectric material disposed in said bore of said head and having longitudinally extending splines on its interior; a guide tube having an upper threaded end adjustably screwed into said counterbore, said tube depending from said head; a graduated gauge tube telescopically mounted in said guide tube with its upper end slidable in said internally splined bearing sleeve; a float connected to the lower end of said gauge tube and slidable vertically in said guide tube, said float being adapted to float on the liquid fuel in the tank and to rise in response to rise of the liquid level; and a cap screwed into the upper end of said mounting member with its upper surface adapted to align with the upper surface of the top wall of the tank.

6. A liquid level gauge as defined in claim 1 in which said mounting member has an annular shoulder at its lower end and against which said head seats when screwed fully into said mounting member, said cap seating against the upper end of said head when screwed fully into said mounting member, the vertical distance between the upper surface of the tank member and said shoulder being substantially equal to the combined vertical thickness of said head and said cap so as to cause the upper end of said cap to lie flush with said top surface of the tank.

7. A liquid level gauge as defined in claim 5 in which said head has an axial boss at its upper end disposed wholly within said mounting member and with its upper end located below the upper end of said mounting member, said boss being engageable by said cap to limit the downward movement of the cap into the mounting member, said boss being of polygonal outline to adapt the head to be rotated by the use of a wrench.

8. A gauge for indicating the liquid content of an aircraft fuel tank, comprising: a mounting means securable against the under surface of the top wall of the tank, said mounting means having an axial vertical bore therein; an elongate cylindrical guide tube depending from said mounting means in axial alignment with said vertical bore; an elongate graduated gauge element slidable axially in said bore and adapted to project above the tank; and a float carried by said element at its lower end and slidable within said guide tube; said float being of considerably less diameter than the internal diameter of said guide tube; and a float cap of non-metallic material secured to the upper end of said float and provided with integral, elongate, projections on its periphery extending parallel with the axis of the guide tube and slidably engageable with the internal surface of said guide tube and providing point-to-point contact therewith so as to minimize friction and preclude tilting of the float as the float slides vertically within said guide tube.

9. A liquid level gauge as defined in claim 1 for use in connection with an aircraft having a wing provided with an upper portion and a fuel tank located within the wing and provided with a top wall spaced below said upper portion, said portion and said wall having vertically aligned openings, said mounting member having an upper peripheral flange securable against the lower surface of said wing portion and a lower peripheral flange securable against the upper surface of said top wall, said mounting member being axially aligned with said openings.

10. A gauge for indicating the liquid content of an aircraft fuel tank, comprising: an annular mounting member securable against the under surface of the top wall of the tank and having an upper reduced portion fitting within an opening in said wall and with its upper end flush with the top surface of said wall, said member having a threaded axial bore and having an annular shoulder at its lower end; a circular head screwed downwardly into said bore and having a bore at its upper end and a screw-threaded counterbore at its lower end, said head engaging said shoulder; a bearing sleeve of dielectric material disposed in said bore of said head and having integral, longitudinally extending splines on its interior; a guide tube having an upper threaded end adjustably screwed into said counterbore, said tube depending from said head; a graduated gauge tube telescopically mounted in said guide tube with its upper end slidable in said internally splined bearing sleeve; a float of dielectric material connected ot the lower end of said gauge tube and slidable vertically in said guide tube, said float being adapted to float on the liquid fuel in the tank and to rise in response to rise of the liquid level, said float being of considerably less diameter than the inside diameter of said guide tube and having integral, elongate, longitudinally extending splines on its sides slidably engageable with the internal surface of said guide tube so as to minimize friction as the float slides vertically within said guide tube, said splines closely fitting within the guide tube and being of considerable length so as to preclude tilting of the float within the guide tube; and a cap screwed into the upper end of said mounting member with its upper surface adapted to align with the upper surface of the top wall of the tank, all of said splines of dielectric material serving to prevent the occurrence of static electricity due to friction between the relatively movable parts.

References Cited in the file of this patent

UNITED STATES PATENTS

| | | |
|---|---|---|
| 340,456 | Phelps | Apr. 20, 1886 |
| 509,170 | Johnson | Nov. 21, 1893 |
| 598,503 | Forrest | Feb. 8, 1898 |
| 688,607 | Dixon | Dec. 10, 1901 |
| 829,103 | Dixon | Aug. 21, 1906 |
| 956,907 | Smith | May 3, 1910 |
| 1,012,677 | Maloney | Dec. 26, 1911 |
| 1,024,377 | Surber | Apr. 23, 1912 |
| 1,193,744 | Wilkinson | Aug. 8, 1916 |
| 1,432,069 | Le Paine | Oct. 17, 1922 |
| 1,602,063 | Williams | Oct. 5, 1926 |
| 1,603,239 | Gregory | Oct. 12, 1926 |
| 2,282,691 | Ashley | May 12, 1942 |